United States Patent [19]
Cantwell et al.

[11] Patent Number: 4,557,139
[45] Date of Patent: Dec. 10, 1985

[54] LEAK DETECTION METHOD AND APPARATUS

[75] Inventors: Thomas Cantwell, Houston; William Simon, Alice; Bobby Young, Pasadena, all of Tex.

[73] Assignee: Loomis International Inc., Pasadena, Tex.

[21] Appl. No.: 636,276

[22] Filed: Jul. 31, 1984

[51] Int. Cl.[4] .................. G01M 3/20; G01M 3/22
[52] U.S. Cl. ........................... 73/40.7; 73/46; 73/49.1
[58] Field of Search ............. 73/40.7, 46, 40.5 R, 73/49.1

[56] References Cited

U.S. PATENT DOCUMENTS

| | | |
|---|---|---|
| 2,255,921 | 9/1941 | Fear . |
| 2,481,013 | 9/1949 | Henderson . |
| 2,573,366 | 10/1951 | Scholl ............................. 73/46 |
| 2,703,978 | 3/1955 | Baxter . |
| 2,708,896 | 5/1955 | Smith et al. ..................... 73/46 |
| 2,766,614 | 10/1955 | Cook ............................... 73/46 |
| 2,817,230 | 12/1957 | McCully .......................... 73/46 |
| 3,199,598 | 8/1965 | Loomis . |
| 3,503,249 | 3/1970 | Dumond . |
| 3,842,659 | 10/1974 | Barcroix . |
| 3,871,209 | 3/1975 | Hasha ............................. 73/46 |
| 3,949,596 | 4/1976 | Hawk ............................ 73/40.7 |
| 4,158,960 | 6/1979 | White et al. . |
| 4,282,743 | 8/1981 | Pickett . |
| 4,429,566 | 2/1984 | Armell et al. . |
| 4,466,273 | 8/1984 | Pillette ........................... 73/46 |

FOREIGN PATENT DOCUMENTS

| | | |
|---|---|---|
| WO84/02978 | 8/1984 | PCT Int'l Appl. . |
| 504638 | 4/1939 | United Kingdom ................. 73/46 |
| 2055210 | 2/1981 | United Kingdom . |
| 2056091 | 3/1981 | United Kingdom . |

OTHER PUBLICATIONS

Author's Certificate 333,431, "Device for Tracing Leaks in Piping", Published on May 15, 1972. (Checking The Seal-Tightness of Construction), pp. 104–105.

*Primary Examiner*—S. Clement Swisher
*Assistant Examiner*—Hezron E. Williams
*Attorney, Agent, or Firm*—Cushman, Darby & Cushman

[57] ABSTRACT

A leak detection apparatus for pipe couplings includes a sleeve for enclosing a small volume on the exterior of a pipe joint with a flow passage on the sleeve for communication with a detection instrument; the sleeve may be a stiff but deformable polyurethane tube having separable edges including reinforcing strips embedded in the sleeve adjacent the edges; the sleeve may also be a fluid impervious fabric web that is, in use, wrapped about a pipe joint. The detection method includes a delay time after the pipe coupling is pressurized. It is also possible to release the pressure prior to sampling, as for example due to safety considerations. The leak detection apparatus includes means for conversion of leaked gas concentration to leak rate.

12 Claims, 5 Drawing Figures

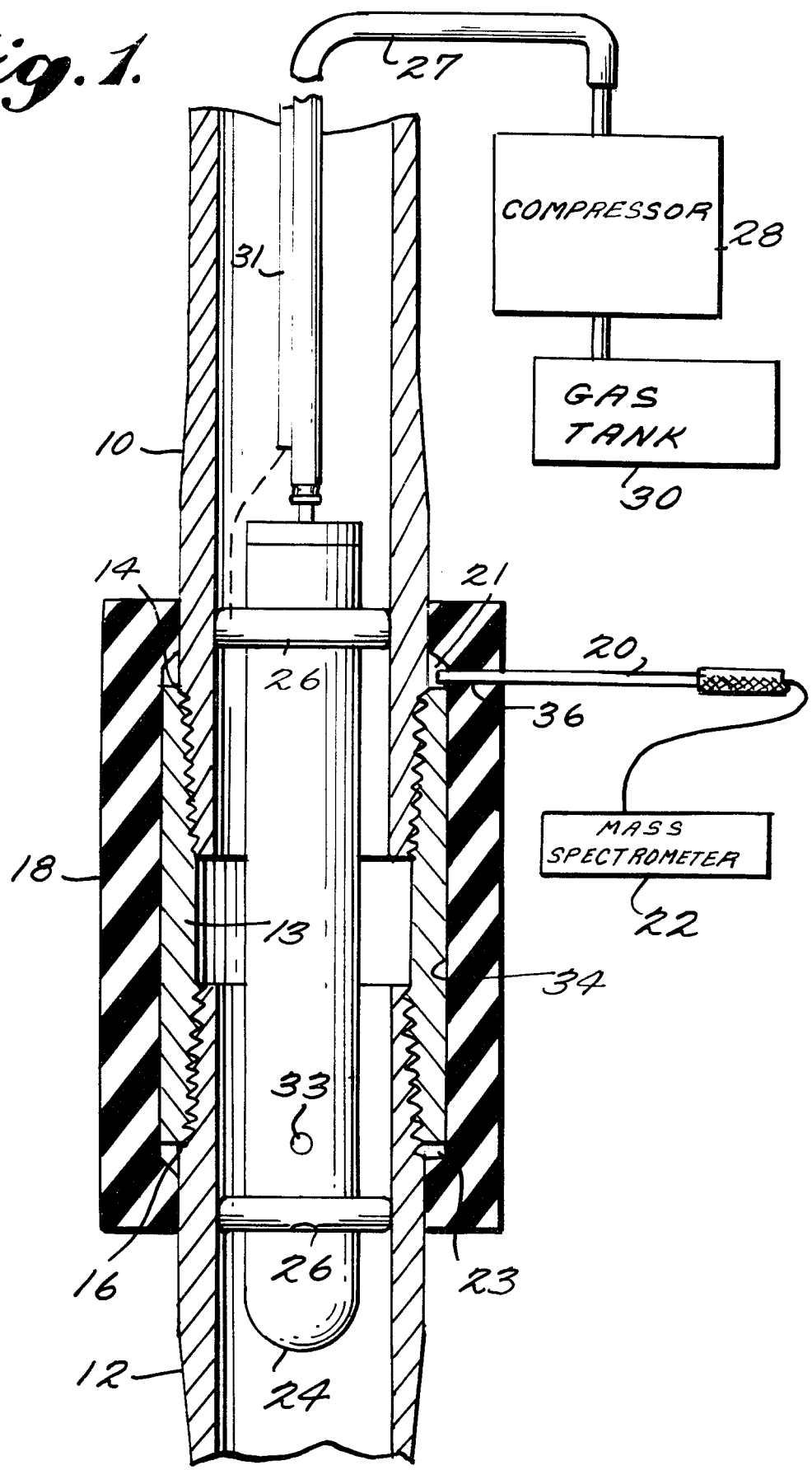

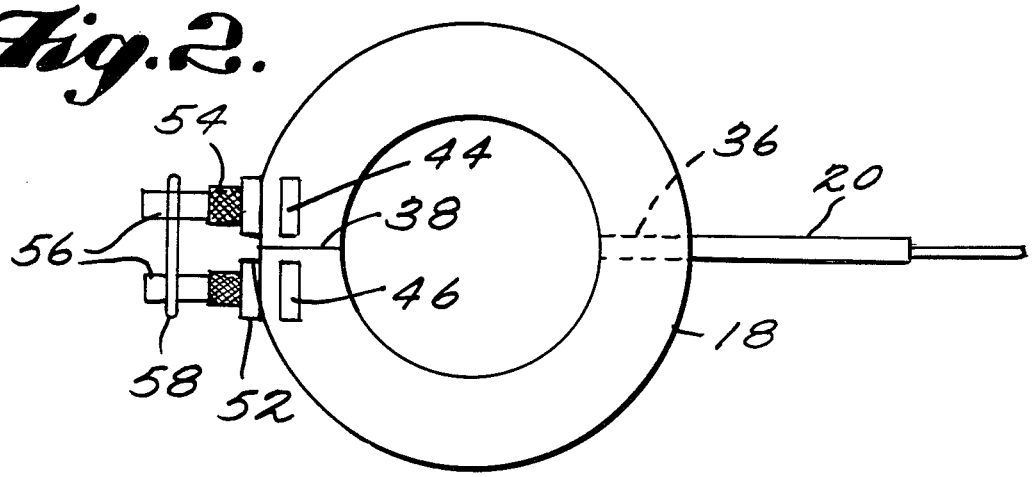
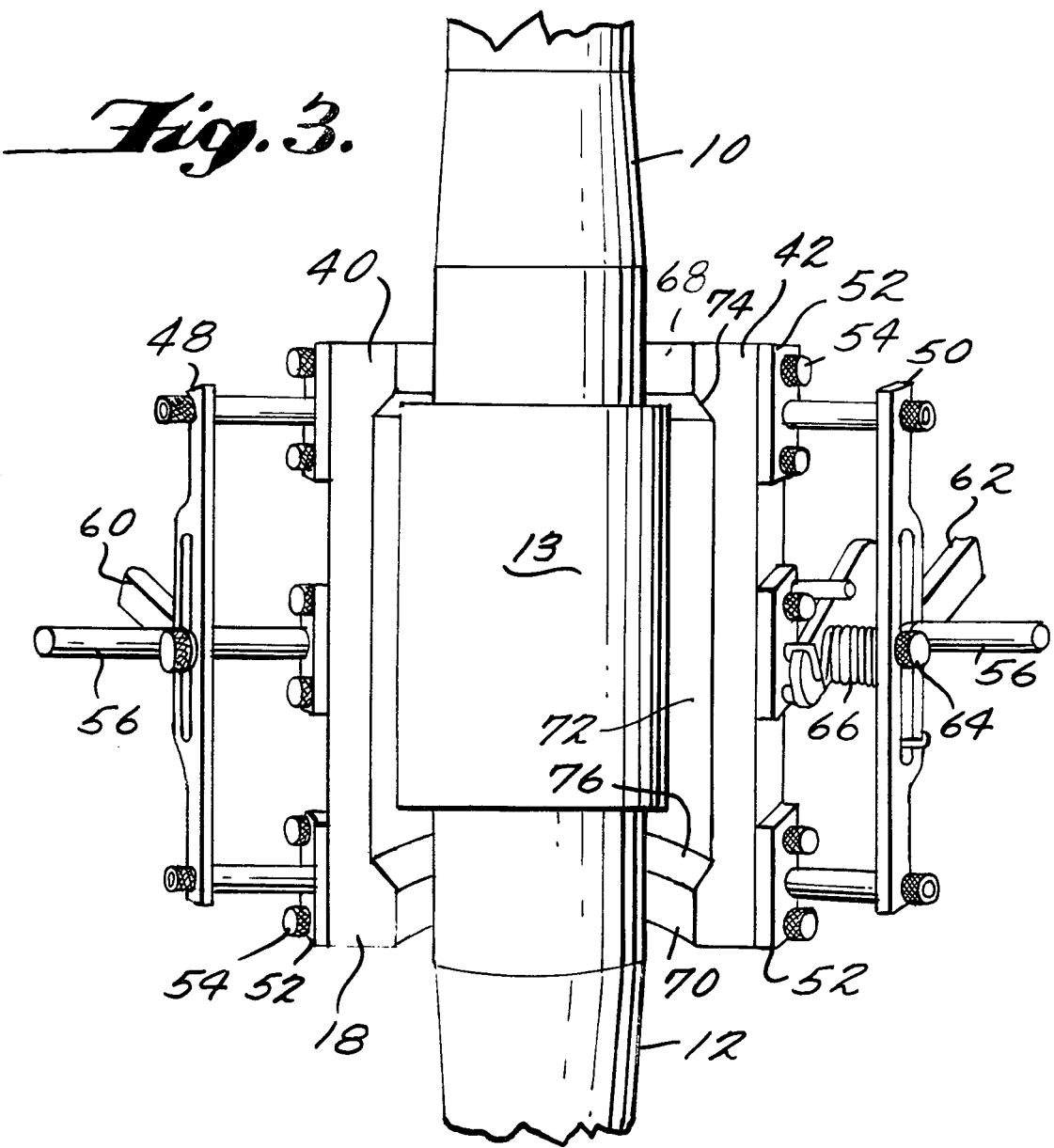

LEAK DETECTION METHOD AND APPARATUS

BACKGROUND AND SUMMARY OF THE INVENTION

The present invention relates to leak detection apparatus for pipe couplings where an improved sleeve means is provided which will reduce the testing time, improve the accuracy heretofore attained in such tests, provide for calculation of leak rate, and allow certain safety procedures to be followed.

In the past, a number of arrangements for leak detection in pipe joints has been proposed and used with varying degrees of success. With the increasing depth of wells, both on and off shore, the pressure to which joints are exposed and for which they must be tested has also increased. Further, the ever mounting costs involved in drilling new wells has required significantly increased sensitivity to leakages down to and including approximately $10^{-6}$ cc/sec.

For some time, it has been known that certain trace contents of a well product where even minute leakage is present will, over time, eventually destroy a pipe string by enlarging the leak until unacceptable pressure loss results.

In carrying out pipe and pipe joint leak testing, it is the usual practice to insert into the pipe a packer assembly such as that disclosed in U.S. Pat. No. 3,038,542, the disclosure of which is hereby incorporated by reference and relied upon. The packer assembly includes at least two spaced packer members that are located on either side of a joint to be tested and then expanded to form a closed volume which sets astride the coupling on the inside of the pipe string. A gas under high pressure is fed to this volume with the pressure being in the neighborhood of or in excess of the estimated operating pressure of the well. Various techniques are available for detecting a leak including sensing any pressure drop in the closed volume defined by the packer assembly and the interior of the pipe joint.

In a more recent development, a test operator places a sleeve or collar about the exterior of the pipe joint and employs a mass spectrometer or other instrument to detect a specific gas fed to the interior of the pipe through a packer assembly at high pressure. One frequently used gas is helium mixed with another non-flammable gas such as nitrogen. In many cases, however, these tests have consumed a great deal of time and have not been accurate enough to detect small leaks, as for example $10^{-5}$–$10^{-6}$ cc/sec. In some cases tests have not been carried out at well operating pressures, which can be in excess of 10,000 psi, and at times in excess of 15,000 psi.

Since a single defective coupling can often result in the necessity of pulling up an entire string, it is extremely important that the test of each coupling be carried out correctly and reliably. Yet it is also important that the testing on each coupling be carried out expeditiously and safely at the expected operating pressure so as not to unnecessarily delay the installation of the pipe string.

The present invention satisfies the foregoing criteria and overcomes certain disadvantages of the prior art devices.

According to the present invention, the testing apparatus includes, in one embodiment, a stiff deformable polyurethane or other polymer sleeve which is dimensioned to closely fit over the exterior of a pipe coupling. The conventional coupling includes two threaded pipe ends which are each threaded with a coupling sleeve from opposing ends of the pipe to be joined. The testing sleeve of the present invention has an interior surface shaped to define a small volume at each end of the coupling sleeve. The volume provided at each end of the coupling sleeve is relatively small and may be between 5 and 300 cc and, preferably, is approximately 10 cc.

The polyurethane testing sleeve is formed with a slit running parallel to its longitudinal axis, thereby forming two parallel edges each of which is reinforced by an embedded metal strip and each of which has anchored to each strip a frame member which, in turn, carries an arm. The arms are held by the test operator to facilitate opening the sleeve to install or remove the sleeve from a pipe coupling.

In another embodiment, a stretchable fabric web is provided with a gas impervious layer such as rubber sheet. In use, the web is tightly wrapped around a coupling and secured in place with a "Velcro" fastener. With this arrangement, due to the resiliency of the fabric and rubber sheet layer, a minimum contained volume will be assured while installation and removal of the fabric web can be done very rapidly.

In order to provide an increased concentration of leaked gas, a delay time is introduced prior to sampling the minimum contained volume after pressure is applied inside the pipe being tested.

Utilizing the delay time, contained volume and gas concentration found in the contained volume, leak rate can be calculated.

The foregoing and other advantages will become apparent as consideration is given to the following detailed description of the invention taken in conjunction with the accompanying drawings, in which

BRIEF DESCRIPTION OF THE DRAWINGS

FIG. 1 is a sectional view in elevation showing the sleeve of the present invention installed on a pipe coupling;

FIG. 2 is a top plan view of the sleeve of FIG. 1;

FIG. 3 is a perspective view in elevation showing the manipulating members mounted on the sleeve of the present invention;

DETAILED DESCRIPTION OF THE INVENTION

Figure 4:
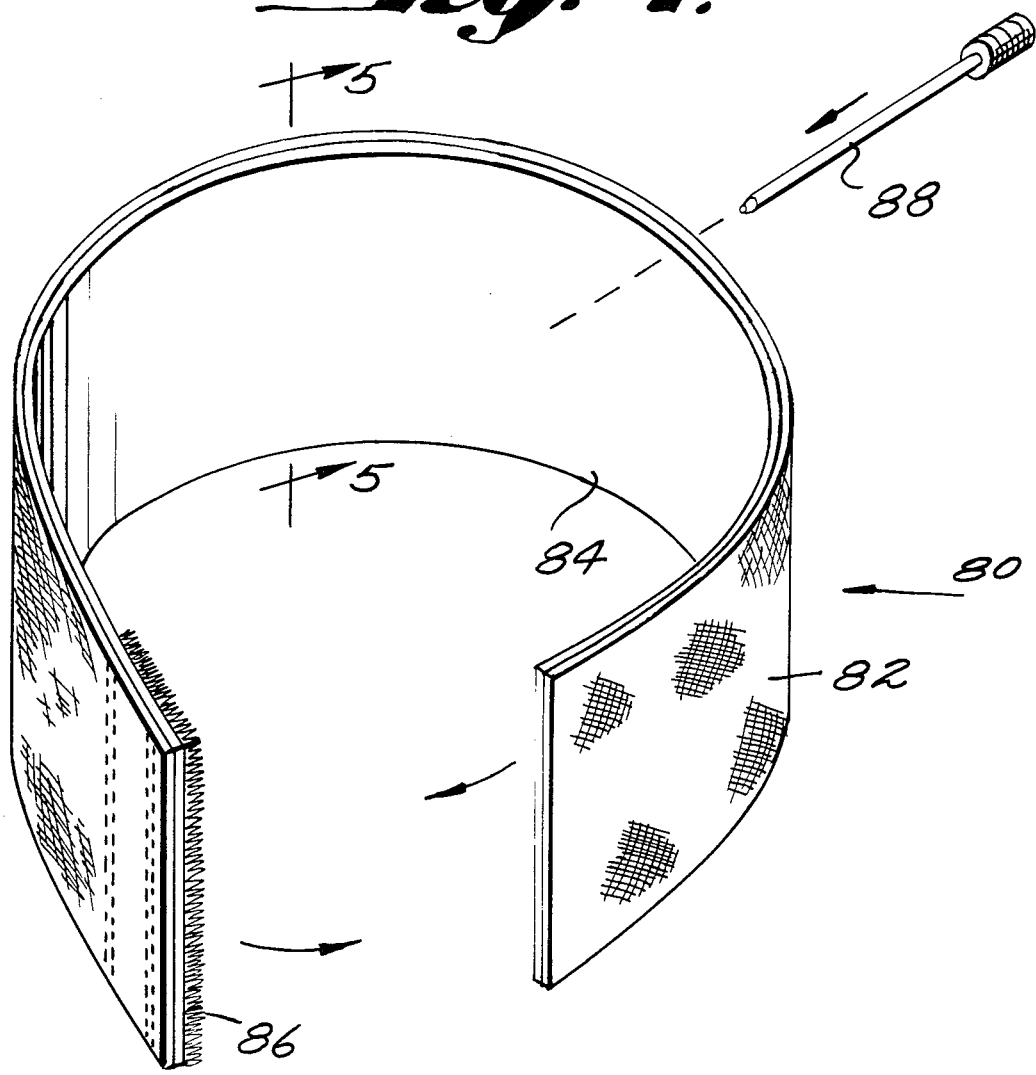
FIG. 4 is an alternate embodiment of the sleeve of the present invention.

Referring now to the drawings wherein like numerals designate corresponding parts throughout the several views, there is shown, in FIG. 1, a pipe coupling which includes a pipe 10 which has a threaded end and a pipe 12, also having a threaded end and a coupling sleeve 13 into the opposite ends of which the pipes 10 and 12 are threadedly inserted to establish the pipe coupling.

As is well understood by those skilled in this art, where the threads of either the pipe 10, 12 or the coupling sleeve 13 are defective or where the threading operation is improperly carried out resulting in damage to the threads of one or more of the elements, leaks will develop across the damaged threads with the leaked fluid eventually emerging from between the coupling sleeve 13 and the associated thread of either the pipe 10 or 12 in the area indicated at the rim of the coupling sleeve 13 at 14 and 16.

It has been found that even minor leaks, that is, those having an extremely low volume flow per unit of time through the pipe coupling can eventually result in unacceptable pressure losses in the well resulting from enlarging of the original leak due to the corrosive nature of some of the substances found in gas or oil wells. As a consequence, it becomes necessary to pull up the entire pipe string and to inspect each coupling to determine its integrity. It has been found that extremely low leak rates, on the order of $10^{-5}$ to $10^{-6}$ cc/second, can be detected with the use of helium and a mass spectrometer 22 including a sniffing probe 20 which is inserted through an opening in the wall of a tubular sleeve 18. Other types of detectors such as thermal conductivity meter can also be used.

According to the present invention, the sleeve 18 is dimensioned so as to closely fit over the pipe coupling to provide a substantially smaller volume within which the test gas may leak in the event of a defective coupling. Thus, the sleeve 18 provides, in combination with the exterior surface of the pipe coupling, a pair of annular closed volumes 21 and 23 which surround the area immediately adjacent the rims 14 and 16 of the coupling sleeve 13. Preferably, the sleeve 18 is a cast, flexible polyurethane although other synthetic material can be employed such as polypropylene, polyester, polyamides and the like.

In carrying out a typical test procedure, a packing assembly 24 is first lowered into the end of the uppermost pipe 10 by a suitable hoist assembly (not shown). For this purpose, pressure hoses 26 should be of the reinforced type or, alternately, a separate hoisting line should be connected to the top end of the packer assembly 24 to assist in positioning the packer assembly 24 adjacent the pipe coupling sleeve 13. The packer assembly 24 is disposed as illustrated, that is, with the inflatable or movable packing members 26 located, respectively, above and below the rims 14 and 16 thereby defining between the packing members 26 a closed volume. One end of a high pressure line 27 is connected to fluid passages on the interior of the packer assembly 24. For a more complete understanding of the construction operation of this packer assembly and similar packer assemblies, reference should be had to the aforementioned U.S. Pat. No. 3,038,542 and, in addition, U.S. Pat. Nos. 3,165,920, 3,154,940, 3,165,918, 3,199,598, 3,165,919, the disclosures of all which are herein incorporated by reference and relied upon. The fluid under pressure for operating the packer members 26 may be supplied through a separate line 31 or, with some apparatus, the operating fluid may be the same as the test gas fed through line 27.

After the packers 26 are located astride the pipe coupling as illustrated, the space or volume between the packers 26 on the interior of the pipes and coupling 13 is filled with a mixture of helium and nitrogen, preferably 10 percent helium and 90 percent nitrogen. The usual test pressures encountered range from 6,000 to 20,000 pounds per square inch. To achieve these pressures at the site of a drilling operation, a compressor 28 has its output fed directly to the hose line 27. Further, a tank 30 containing the mixture of helium and nitrogen or other suitable mixture, is provided at the site and is fed directly to the intake of the compressor 28. Helium is the preferred gas since it is readily detectable by a reasonably priced mass spectrometer in extremely low concentrations.

In a test procedure, the sleeve 18 is placed about the coupling as illustrated in FIG. 1, usually after the packer assembly 24 is in position with the packing members 26 astride the pipe coupling. With the packer members 26 pressurized, the test gas is supplied to the space between the packers 26 at a suitably high pressure through, for example, an orifice 33 which is connected to the line 27 internally of the packer assembly 24. The test worker then waits for the test gas to accumulate. A suitable period is approximately 20 seconds before sampling the gas in the chamber 21 which he does for approximately 7 seconds. The mass spectrometer 22 will quickly indicate the presence of helium signifying a leak. The test worker will then test the lower volume 23 by inserting the probe 20 into a similarly formed bore through the wall of the sleeve 18.

The inner wall 34 of the testing sleeve 18 must be smooth and have a matching curvature matching that of the external surface of the coupling sleeve 13 so that the two test volumes 21 and 23 will be isolated from each other thus enabling a worker to distinguish the test results and thereby determine which of the inter-engaging thread sets is actually defective.

With reference now to FIGS. 2 and 3, there is illustrated manipulating members for the sleeve 18 of the present invention. As previously noted, the sleeve 18 is preferably made from a stiff but deformable polyurethane plastic which, in its rest or closed position, assumes a cylindrical shape so taking the appearance of an annulus in the top plan view of FIG. 2. Along one side, the sleeve 18 is provided with a slit 38 which extends parallel to the longitudinal axis of the sleeve 18. Preferably, the slit 38 is provided when the sleeve is originally molded so that the resulting parallel edges 40 and 42 will be smooth surfaced. According to the present invention, when the sleeve 18 is molded, adjacent each of the edges 40 and 42, there are provided along the length of the sleeve 18 metal reinforcing strips or bars, the top ends of which appear in FIG. 2 at 44 and 46.

As shown in FIG. 3, frame members 48 and 50 are mounted on the exterior surface of the sleeve 18 adjacent the respective edges 40 and 42. The upper and lower ends of the frame members 48 and 50 are mounted on plates 52 which are held in place on the exterior surface of the sleeve 18 by screws 54 which pass through the material of the sleeve 18 to engage threaded bores formed in the metal strips 44 and 46, respectively. The frame members 48 and 50 each have a centrally located post 56 extending substantially perpendicularly from the respective frame members 48 and 50. When the sleeve 18 is installed on a pipe coupling, it will assume the position as illustrated in FIG. 2. In this position the posts 56 may be bound together to assist in retaining the sleeve 18 on the pipe coupling.

Frame member 48 supports a gripping arm 60 and frame member 50 supports a movable gripping arm 62. Arm 62 is mounted on a pin 64 with a spring means 66 interposed between the end of the arm and the frame member 50. With this arrangement, a worker need merely grasp the arms 60 and 62 and push them towards each other to open the sleeve 18 a distance sufficient to permit the sleeve to be inserted around a coupling sleeve 13 of a pipe joint. The natural resilience of the deformable sleeve 18 will force the sleeve to its closed position as illustrated in FIG. 2.

Referring again to FIG. 3, the interior surface of the sleeve 18 is provided with two annular shoulders 68 and 70 at opposite ends of the sleeve. A reduced thickness portion 72 extends between the shoulders 68 and 70 and, in general, is the portion that will overlie the coupling sleeve 13. The inner surfaces 74 and 76 of the shoulders 68 and 70, respectively, slope outwardly towards their respective ends of the sleeve to at least partially define the enclosed volume which is probed for the test gas.

Figure 5:
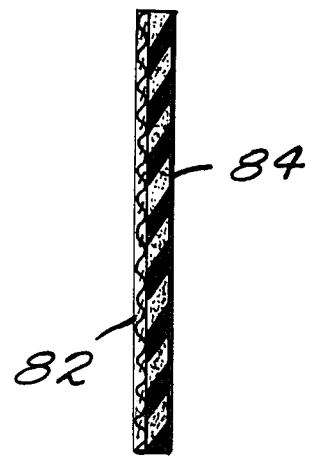
FIG. 5 is a view along lines 5—5 of FIG. 4.

Turning now to FIGS. 4 and 5, there is shown an alternate embodiment of the present invention in the form of a fabric web 80. The fabric web has on its exterior a knitted or woven fabric 82 which preferably has loop piles extending outwardly. The inner surface or layer of the fabric 80 is an impervious layer of stretchable material such as rubber sheet. Certain plastic materials may also be employed such as polyethelyne or polyester sheet. The width of the fabric 80 may be selected so as to completely cover the upper or lower end of the coupling sleeve 13 and a small portion of the adjacent pipe. On the inside, adajcent one free edge of the web 80, a "Velcro" type fastener 86 is secured. With this arrangement, the length of the fabric web 80 can be made sufficiently long so that it can be tightly wrapped around a large variety of different sized couplings and still effectively provide a minimum enclosured volume for the needle probe 88 which is connected to the mass spectrometer. The flexibility and resilient stretchability of the fabric will insure that a minimum volume is enclosed thus reducing the accumulation time without sacrificing the integrity of the test process.

In use, a worker need simply wrap the fabric web 80 tightly about a joint coupling and then fasten the fastener 86 at a point along the exterior surface 82 of the fabric. The actual sampling is then carried out as with the previous embodiment.

Even with a delay time of 20 seconds before sampling, the test can be completed in about 30 seconds after the pressure is applied inside the pipe. This delay time is an essential part of this method and allows leaked gas to build in concentration prior to sampling.

This method can be adapted for safety reasons to allow the pressurization of the inside of the pipe and then, at a subsequent adequate time of approximately 20 seconds, the removal of the pressure before sampling the contained volume.

By utilizing measurements with records of contained volume, test gas concentration, and delay time, leak rate can be calculated. A worker should calibrate the measuring instrument with a known concentration of gas at intervals no less than several hours.

Having described the invention, it will be apparent that to those skilled in this art that various modifications may be made thereto without departing from the spirit or the scope of this invention as defined in the appended claims.

What is claimed is:

1. A leak detection apparatus for a pipe coupling joint comprising:
   means insertable into a pipe and locatable astride a joint, said insertable means including a pair of spaced apart means for engaging the inner surface of the pipes being coupled and conduit means for feeding a gas into a first volumn defined by said pair of engaging means and the portion of the interior of the pipes extending between said pair of engaging means with said first volumn including at least one pipe joint,
   deformable sleeve means having slot means permitting said sleeve means to be disposed about the exterior surface of a pipe joint to define a second volumn between the interior of said sleeve means and the site of the joint externally thereof, with the interior of said sleeve means being shaped so as to limit said second volume to a capacity of between 5 cc and 300 cc, said sleeve means including passage means for establishing communication between said second volumn and means for detecting the presence of a gas in said second volumn, said sleeve means comprising a resiliently deformable tube having a longitudinal axis and an opening defined by a pair of facing edges extending substantially parallel to said axis with said edges being movable away from each other to permit said tube to placed about a pipe joint and towards each other to close said tube about the pipe joint, said tube having a pair of reinforcing metal strips embedded therein extending parallel to said longitudinal axis, one of said strips being adjacent one of said edges and the other of said strips being adjacent the other of said edges.

2. The apparatus as claimed in claim 1, wherein said second volume's capacity is between 8 and 12 cc.

3. The appartus as claimed in claim 1, wherein said sleeve means is polyurethane.

4. The apparatus as claimed in claim 1, wherein said tube is polyurethane.

5. The apparatus as claimed in claim 1, wherein said tube has a pair of manually engageable mainpulating means mounted on the exterior thereof, one of said maniupulating means being attached through the material of said tube to one of said strips and the other of said manipulating means being attached through the material of said tube to the other of said strips.

6. The apparatus as claimed in claim 5, wherein at least one of said manipulating means includes a frame member, a lever arm mounted on said frame member extending generally transverse to said longitudinal axis and spring means extending between a portion of said frame member and said lever arm urging said lever arm towards said tube.

7. The apparatus as claimed in claim 1, wherein said passage means is disposed on a side of said sleeve means opposite said opening.

8. The apparatus as claimed in claim 5, wherein each said manipulating means includes a post means and said apparatus includes locking means connectable across said post means of both said manipulating means to hold said apparatus on the exterior surface of a pipe joint.

9. The apparatus as claimed in claim 1, wherein said deformable sleeve means comprises a fabric web having on one side thereof a fluid impervious layer.

10. The apparatus as claimed in claim 9, wherein said fluid impervious layer is a rubber web secured to said fabric web.

11. The apparatus as claimed in claim 9, wherein said fabric web has spaced ends and the length of said fabric web being such that said ends overlap where said web is wrapped around a pipe joint.

12. The apparatus as claimed in claim 11, wherein one end of said fabric web is provided with means for attachment to the other side of said fabric web.

* * * * *